Aug. 23, 1938.   G. C. SPICER ET AL   2,127,705
CAMERA SHUTTER
Filed Sept. 28, 1937   2 Sheets-Sheet 1
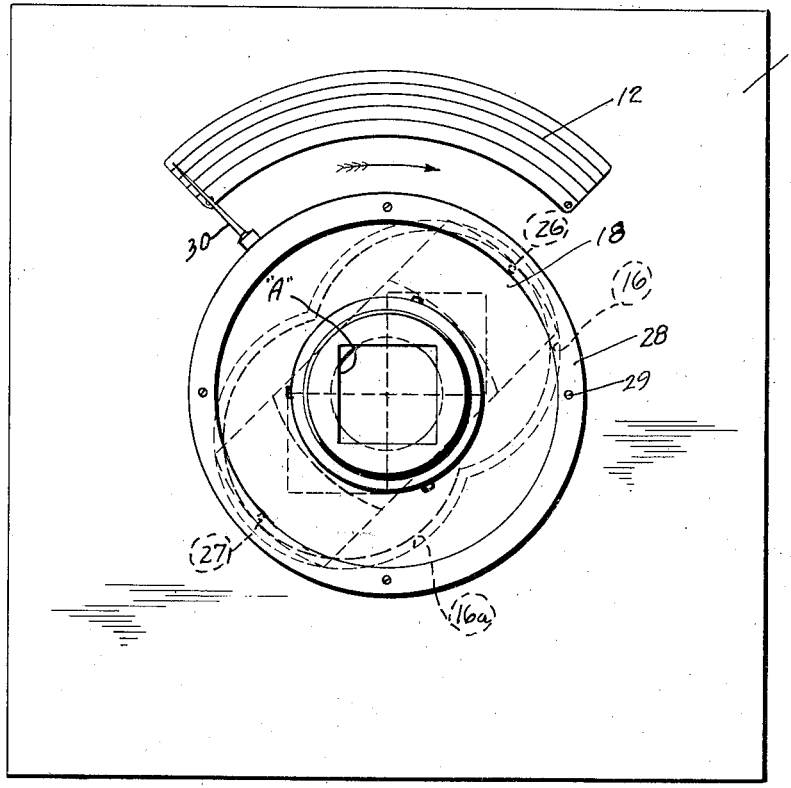
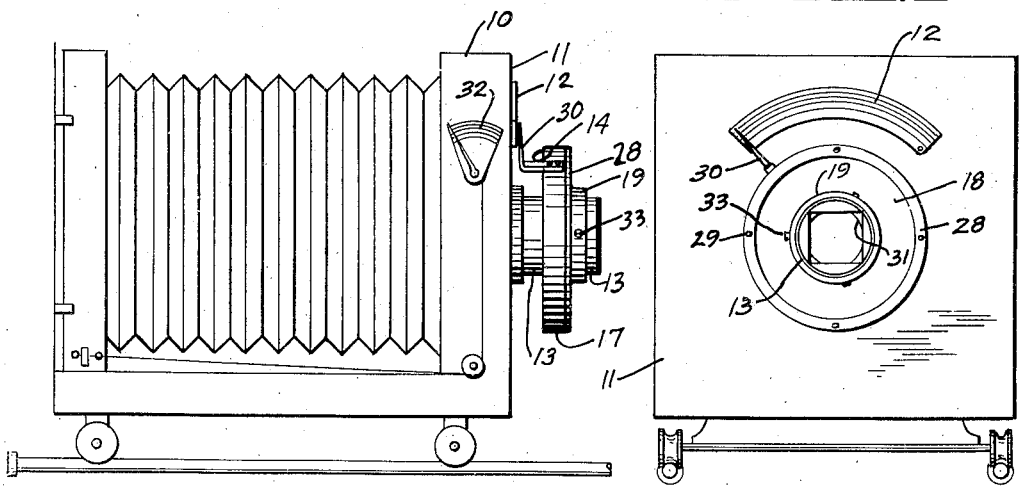
INVENTOR.
Grover C. Spicer &
Otto J. Lange
BY John A. Bommhardt
ATTORNEY.

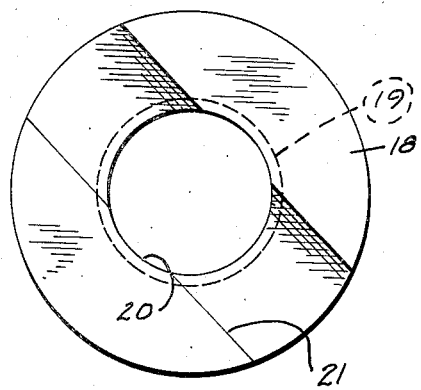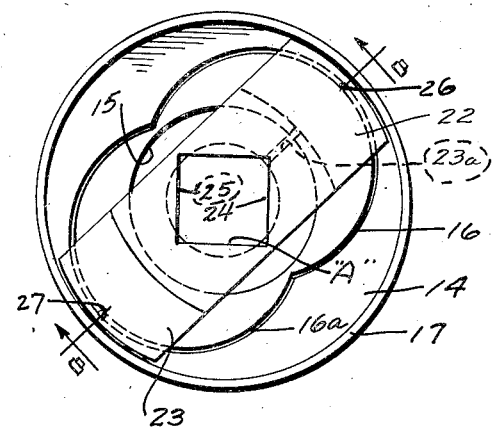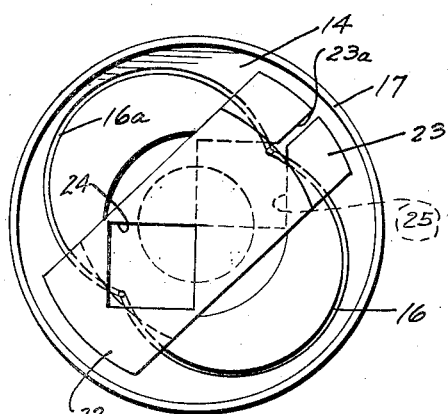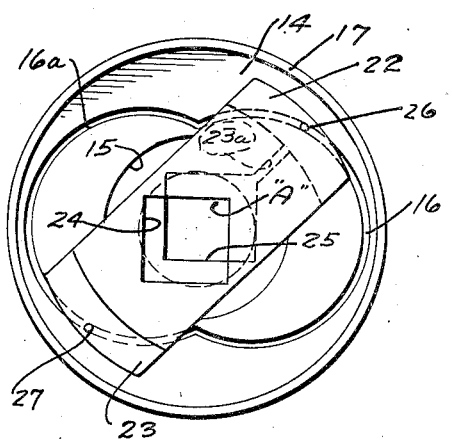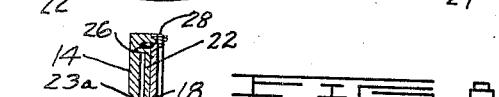

Patented Aug. 23, 1938

2,127,705

UNITED STATES PATENT OFFICE 2,127,705

CAMERA SHUTTER

Grover C. Spicer, Lyndhurst, and Otto J. Lange, Fairview, Ohio

Application September 28, 1937, Serial No. 166,098

2 Claims. (Cl. 95—56)

Our invention relates to a photographic shutter for producing a round dot in half-tone negatives by the use of a graduated square stop.

In half-tone negatives the larger dot, produced by the use of the square stop, allows a greater depth and eliminates the difficulties of overlapping which is the result of a round stop when it is necessary to get a larger dot for highlights in etching.

A further advantage is that due to the square stop and round dot, the etcher is able to re-etch to a much greater extent, improving the half-tone and making it possible to clean up the plate after regular etching.

These and further advantages may be noted from device disclosed in the following specification and its accompanying illustrations in which:

Fig. 1 is a front elevation of the device with the shutters fully opened.

Fig. 2 is a side elevation of a camera with the device installed.

Fig. 3 is a front elevation of Fig. 2.

Fig. 4 is a rear elevation of the stationary shutter slide member.

Fig. 5 is a front elevation of the diaphragm cam and shutters in the open position.

Fig. 6 is a view similar to Fig. 5, but showing the diaphragm cam revolved and the shutters in a partially open position.

Fig. 7 shows the fully closed shutters and revolved cam.

Fig. 8 is a section taken on line 8—8 of Fig. 5.

Again referring to the illustrations, the face of the camera 10 is indicated at 11, with a lens scale 12 mounted thereon. A split barrel 13 is mounted in the center of the face 11 of the said camera 10, and has a rotatable shutter or diaphragm cam 14 mounted therebetween having an aperture 15 in the center therethrough and eccentric circular grooves 16 and 16a, in the outer face thereof, the outer periphery of the shutter or diaphragm cam being flanged at 17.

A stationary shutter slide member 18 is shouldered at 19 and has a center aperture 20 therethrough, the inner face of said stationary shutter slide member being grooved at 21 across its face at a 45 degree angle as shown specifically in Fig. 4.

A pair of shutters 22 and 23 are mounted slidably within the groove 21 of the stationary shutter slide member 18 and between the inner face of the said member and the outer face of the rotatable diaphragm cam 14, the shutters 22 and 23 having square apertures 24 and 25 respectively cut therethrough at a 45 degree angle to the top and bottom edges thereof, and adjacent the inner end of each shutter the opposed ends of said shutters 22 and 23 have pins 26 and 27 mounted rigidly therein respectively. Shutter 23 is slotted at 23a from the inner end to the square aperture 25.

The pins 26 and 27 are slidably mounted within the grooves 16 and 16a respectively in the face of the rotatable shutter or diaphragm cam 14 as indicated by the Figs. 5, 6, 7 and 8 specifically, the stationary shutter slide member 18 being held in position within the flanged periphery 17 of the rotatable shutter or diaphragm cam 14 by a ring 28 secured to the flange 17 by screws 29.

A gage or scale indicator 30 is rigidly secured to the flange 17 of the rotatable shutter or diaphragm cam 14 approximately on the 45 degree line to the left of the center of the lens tube 31, the movement of the indicator 30 across the face of the lens scale 12 synchronizing with the (camera setting) scale 32 on the side of the camera 10.

In operation, the setting of the lens scale 12 to synchronize with the scale setting 32 is obtained by rotating the rotatable shutter or diaphragm cam 14 until the indicator 30 reads the same as the scale 32, this rotation causes the pins 26 and 27 in the opposed ends of the shutters 22 and 23 to move in the eccentric grooves 16 and 16a respectively in the face of the rotatable shutter or diaphragm cam 14, this in turn causes the shutters 22 and 23 to slide in or out within the slot 21 in the face of the stationary shutter slide member 18, the slot 23a in the shutter 23 allowing the passage of the end of the said shutter beyond the pin 26. As the shutters 22 and 23 move inwardly the square opening "A" gets smaller and as they move outwardly the said opening gets larger as illustrated by Figs. 5, 6, and 7. The stationary shutter slide member 18 is secured to the split barrel 13 by set screws 33 to prevent any movement, as the diaphragm cam 14 is rotated, the maintaining of the 45 degree angle of the slot 21 being necessary for the proper operation of the shutters.

This operation eliminates all guess work caused by using individual stops and gives a positive control for square stops. It will be noted that the two sliding parts 22 and 23 are mounted to slide at a 45 degree angle thus maintaining the four sides of the square opening, parallel to the sides of the camera which is necessary to make the round dot.

Although we have described a particular embodiment of the present invention, it will be apparent that various changes, additions, substitutions can be made therein without departing from the spirit of the invention or the scope of the appended claims.

We claim:

1. A camera shutter comprising a fixed plate having a central opening and a diametrical guide groove across its inner face, a pair of overlapping blades both slidable radially in said groove, said blades having square openings the edges of which extend at 45° angles to the line of movement of the blades and which openings may be registered more or less with each other, and a cap plate rotatable on the fixed plate and enclosing the blades, said plate having a pair of intersecting eccentric circular grooves therein, the blades having pins engaged in said grooves.

2. A camera shutter as in claim 1, one of the blades having a longitudinal slot through which the pin of the other blade extends.

GROVER C. SPICER.
OTTO J. LANGE.